United States Patent
Sawawatari et al.

(10) Patent No.: US 9,429,254 B2
(45) Date of Patent: Aug. 30, 2016

(54) AUSTENITIC ALLOY PIPE AND METHOD FOR PRODUCING THE SAME

(75) Inventors: Naoki Sawawatari, Tokyo (JP); Kouichi Kuroda, Tokyo (JP); Hitoshi Suwabe, Tokyo (JP); Masaki Ueyama, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 320 days.

(21) Appl. No.: 14/006,156

(22) PCT Filed: Mar. 19, 2012

(86) PCT No.: PCT/JP2012/057041
§ 371 (c)(1),
(2), (4) Date: Sep. 19, 2013

(87) PCT Pub. No.: WO2012/128258
PCT Pub. Date: Sep. 27, 2012

(65) Prior Publication Data
US 2014/0083576 A1  Mar. 27, 2014

(30) Foreign Application Priority Data
Mar. 24, 2011 (JP) ................................. 2011-065895

(51) Int. Cl.
*C22C 38/00* (2006.01)
*C21D 9/08* (2006.01)
(Continued)

(52) U.S. Cl.
CPC . *F16L 9/02* (2013.01); *C21D 8/10* (2013.01); *C21D 8/105* (2013.01); *C21D 9/08* (2013.01);
(Continued)

(58) Field of Classification Search
None
See application file for complete search history.

(56) References Cited

U.S. PATENT DOCUMENTS

| | | | |
|---|---|---|---|
| 2005/0178456 A1* | 8/2005 | Tsuru | B21C 37/065 138/171 |
| 2010/0005848 A1* | 1/2010 | Osako | B21D 3/02 72/365.2 |
| 2010/0170320 A1* | 7/2010 | Sagara | C21D 6/005 72/368 |

FOREIGN PATENT DOCUMENTS

| | | |
|---|---|---|
| EP | 1541252 | 6/2005 |
| EP | 2163655 | 3/2010 |

(Continued)

*Primary Examiner* — Humera Sheikh
*Assistant Examiner* — Lucas Wang
(74) *Attorney, Agent, or Firm* — Clark & Brody (57) ABSTRACT

There is provided an austenitic alloy pipe that is durable even if a stress distribution different according to usage environment is applied. The austenitic alloy pipe in accordance with the present invention has a tensile yield strength $YS_{LT}$ of at least 689.1 MPa. The tensile yield strength $YS_{LT}$, a compressive yield strength $YS_{LC}$ in a pipe axial direction, a tensile yield strength $YS_{CT}$ in a pipe circumferential direction of the alloy pipe, and a compressive yield strength $YS_{CC}$ in the pipe circumferential direction satisfy Formulas (1) to (4).

$$0.90 \le YS_{LC}/YS_{LT} \le 1.11 \quad (1)$$

$$0.90 \le YS_{CC}/YS_{CT} \le 1.11 \quad (2)$$

$$0.90 \le YS_{CC}/YS_{LT} \le 1.11 \quad (3)$$

$$0.90 \le YS_{CT}/YS_{LT} \le 1.11 \quad (4)$$

19 Claims, 5 Drawing Sheets

(51) Int. Cl.
  *C21D 8/10* (2006.01)
  *F16L 9/02* (2006.01)
  *C21D 9/14* (2006.01)
  *C22C 38/02* (2006.01)
  *C22C 38/04* (2006.01)
  *C22C 38/42* (2006.01)
  *C22C 38/44* (2006.01)
  *B21B 19/06* (2006.01)

(52) U.S. Cl.
  CPC ............... *C21D 9/14* (2013.01); *C22C 38/001* (2013.01); *C22C 38/02* (2013.01); *C22C 38/04* (2013.01); *C22C 38/42* (2013.01); *C22C 38/44* (2013.01); *B21B 19/06* (2013.01); *C21D 2211/001* (2013.01)

(56) References Cited

FOREIGN PATENT DOCUMENTS

| | | |
|---|---|---|
| JP | 63-210236 | 8/1988 |
| JP | 10-57842 | 3/1998 |
| JP | 10-80715 | 3/1998 |
| JP | 2005-015823 | 1/2005 |

* cited by examiner

AUSTENITIC ALLOY PIPE AND METHOD FOR PRODUCING THE SAME

TECHNICAL FIELD

The present invention relates to an alloy pipe and a method for producing the same and, more particularly, to an austenitic alloy pipe and a method for producing the same.

BACKGROUND ART

For oil wells and gas wells (in this description, oil wells and gas wells are generally called "oil wells"), oil country tubular goods are used. Since the oil wells have corrosive environments, the oil country tubular goods are required to be corrosion resistant. On the other hand, an austenitic alloy represented by an austenitic stainless steel has an excellent corrosion resistance. Therefore, the austenitic alloy pipe is used as the oil country tubular goods.

The oil country tubular goods includes two types: casing and tubing. The casing is inserted into the well. Between the casing and a well wall, cement is filled in, and thereby the casing is fixed in the well. The tubing is inserted into the casing to allow a produced fluid such as oil or gas to flow therein.

The oil country tubular goods is also required to have a high strength in addition to the excellent corrosion resistance. The strength grade of oil country tubular goods is generally defined in terms of tensile yield strength in the pipe axial direction. The user of oil country tubular goods deduces the environments (stratum pressure, temperature and pressure of produced fluid) of the well to be drilled from exploratory drilling and geological survey, and selects an oil country tubular goods of a durable strength grade.

"Temperature and texture effects on properties for CRA's, Corrosion 92 The NACE Annual Conference and Corrosion Show Paper No. 58" describes that for the cold-worked corrosion-resistant alloy pipe, the compressive yield strength in the pipe axial direction is lower than the tensile yield strength in the pipe axial direction. As described above, the strength grade of oil country tubular goods is generally defined in terms of tensile yield strength. Therefore, the difference between the compressive yield strength and the tensile yield strength is preferably smaller.

JP10-80715A and JP11-57842A propose producing methods for enhancing the compressive yield strength in the pipe axial direction.

JP10-80715A describes as described below. In the method for producing a steel tube disclosed in this Patent Document, the ratio Q of wall thickness working ratio to outside diameter working ratio ($Q=R_T/R_D$: $R_T$ is reduction of area of wall thickness, $R_D$ is reduction of area of outside diameter) at the cold working time is regulated to 1.5 or less. Thereby, a steel tube excellent in compressive strength in the tube axial direction can be obtained. Specifically, the compressive strength in the tube axial direction of steel tube is 80% or more of the tensile strength (0.2% yield stress).

JP11-57842A describes as described below. In the method for manufacturing a steel pipe disclosed in this Patent Document, a cold-worked steel pipe is subjected to heat treatment at a temperature of 200 to 400° C. The compressive strength in the pipe axial direction is enhanced by heat treatment because the dislocation introduced into the steel by cold working is relocated by heat treatment. Specifically, with the manufacturing method of this Patent Document, the compressive strength in the pipe axial direction of steel pipe becomes 80% or more of the tensile strength (0.2% yield stress).

DISCLOSURE OF THE INVENTION

In the case where an austenitic alloy pipe is used as an oil country tubular goods, the distribution of stresses applied to the oil country tubular goods changes according to the usage environment of oil country tubular goods. Therefore, even if the oil country tubular goods whose compressive yield strength in the pipe axial direction has been enhanced by the producing methods described in the above-described Patent Documents is used, depending on the usage environment of oil country tubular goods, a greater stress may be applied from a direction other than the pipe axial direction. Therefore, it is preferable that the oil country tubular goods be durable against such a stress. Further, in the producing methods described in the above-described Patent Documents, the difference between the compressive yield strength and tensile yield strength in the pipe axial direction of the austenitic alloy pipe may not be made sufficiently small in some cases.

An object of the present invention is to provide an austenitic alloy pipe that is durable even if a stress distribution different according to usage environment is applied.

The austenitic alloy pipe in accordance with the present invention has a yield strength of at least 689.1 MPa. The tensile yield strength $YS_{LT}$ (MPa) in the pipe axial direction of the alloy pipe, the compressive yield strength $YS_{LC}$ (MPa) in the pipe axial direction thereof, the tensile yield strength $YS_{CT}$ (MPa) in the pipe circumferential direction of the alloy pipe, and the compressive yield strength $YS_{CC}$ (MPa) in the pipe circumferential direction thereof satisfy Formulas (1) to (4).

$$0.90 \le YS_{LC}/YS_{LT} \le 1.11 \quad (1)$$

$$0.90 \le YS_{CC}/YS_{CT} \le 1.11 \quad (2)$$

$$0.90 \le YS_{CC}/YS_{LT} \le 1.11 \quad (3)$$

$$0.90 \le YS_{CT}/YS_{LT} \le 1.11 \quad (4)$$

The austenitic alloy pipe in accordance with the present invention has a low anisotropy of yield strengths because Formulas (1) to (4) are satisfied. Therefore, the austenitic alloy pipe in accordance with the present invention is durable even if a stress distribution different according to usage environment is applied.

The austenitic alloy pipe may have a chemical composition comprising, by mass percent, C: at most 0.03%, Si: at most 1.0%, Mn: 0.3 to 5.0%, Ni: 23 to 52%, Cr: 20 to 30%, N: 0.005 to 0.50%, Mo: at most 9%, and Cu: at most 3%, the balance being Fe and impurities.

The austenitic alloy pipe may comprise, in place of some of Fe, one or more types selected from a group consisting, by mass percent, of Ca: at most 0.01%, Mg: at most 0.01%, and rare earth metal (REM): at most 0.20%.

Preferably, the austenitic alloy pipe is produced by being subjected to straightening using a straightening machine and low-temperature heat treatment at 300 to 550° C. after being cold-worked.

Preferably, the austenitic alloy pipe is produced by being subjected to low-temperature heat treatment after being straightened.

The method for producing an austenitic alloy pipe in accordance with the present invention includes a process for producing an austenitic alloy material pipe, a process for cold-working the material pipe, and a process for producing an austenitic alloy pipe, in which by straightening the cold-worked material pipe by using a straightening machine, and by subjecting the material pipe to low-temperature heat treatment at 300 to 550° C., the alloy pipe is provided with a yield strength of 689.1 MPa, and wherein for the alloy pipe, the tensile yield strength $YS_{LT}$ (MPa) in the pipe axial direction, the compressive yield strength $YS_{LC}$ (MPa) in the pipe axial direction, the tensile yield strength $YS_{CT}$ (MPa) in the pipe circumferential direction, and the compressive yield strength $YS_{CC}$ (MPa) in the pipe circumferential direction satisfy Formulas (1) to (4).

The austenitic alloy pipe produced by the method of the present invention has a low anisotropy of yield strengths, and therefore is durable even if a stress distribution different according to usage environment is applied.

BEST MODE FOR CARRYING OUT THE INVENTION

An embodiment of the present invention will now be described in detail with reference to the accompanying drawings. The same symbols are applied to the same or equivalent elements, and the explanation thereof is not repeated. Hereunder, the symbol "%" concerning the content of each element means "percent by mass".

The present inventors conducted various studies and examinations, and resultantly obtained the findings described below.

Figure 1:
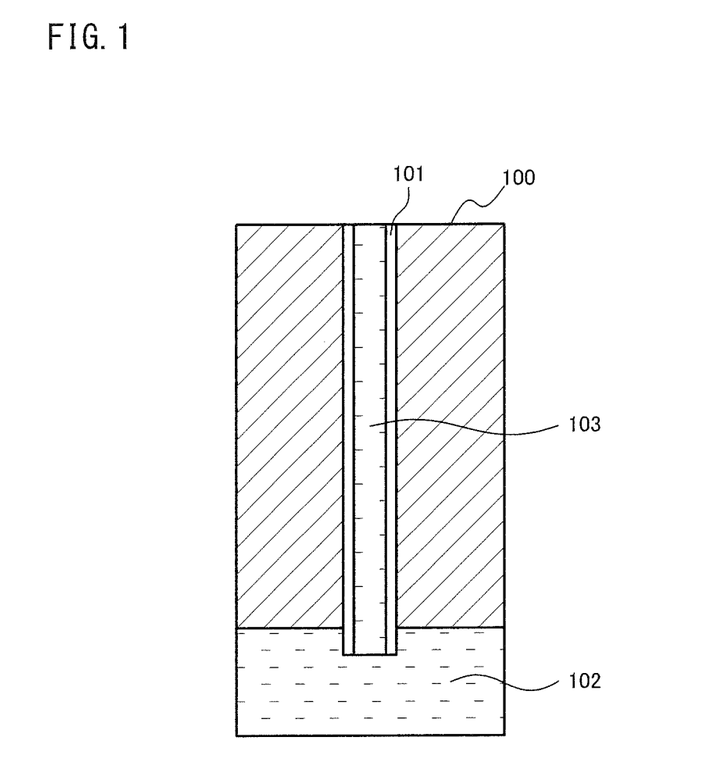
FIG. 1 is a schematic view of an oil well and an oil country tubular goods.

An oil country tubular goods used as a casing or tubing receives a tensile load and a compressive load in the pipe axial direction. FIG. 1 is a schematic view of an oil well and an oil country tubular goods. Referring to FIG. 1, an oil country tubular goods 101 is inserted into a stratum 100. The lower end of the oil country tubular goods 101 is arranged in an oil well 102. At this time, the oil country tubular goods 101 receives a tensile load in the pipe axial direction on account of the pipe's own weight. Further, a produced fluid 103 flows in the oil country tubular goods 101. Since the produced fluid 103 has a high temperature, the oil country tubular goods 101 is thermally expanded. Usually, the upper and lower ends of the oil country tubular goods 101 are fixed. Therefore, when the produced fluid 103 is caused to flow in the oil country tubular goods 101, the oil country tubular goods 101 receives a compressive load in the pipe axial direction. Thus, the oil country tubular goods receives the tensile load and compressive load in the pipe axial direction.

Figure 2:
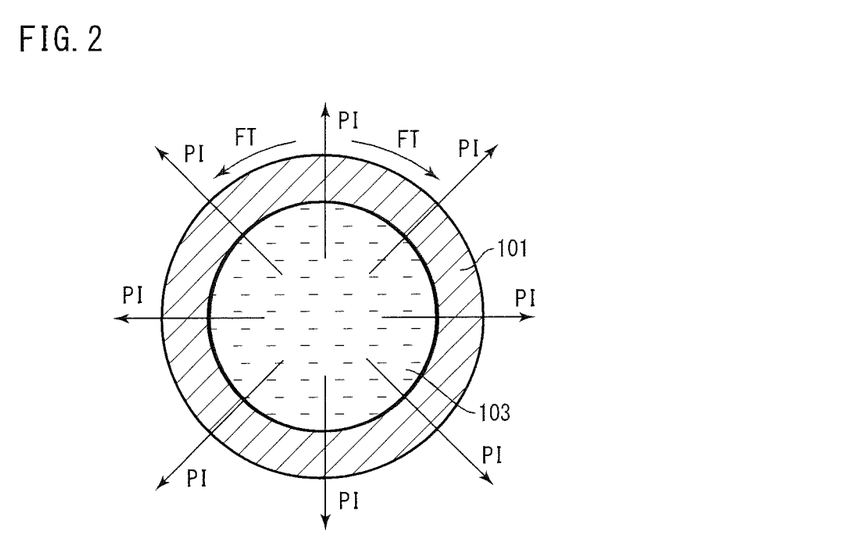
FIG. 2 is a sectional view of the oil country tubular goods shown in FIG. 1.

Further, the oil country tubular goods is required to have internal pressure resistance and external pressure resistance. FIG. 2 is a sectional view of the oil country tubular goods 101 shown in FIG. 1. Referring to FIG. 2, when the produced fluid 103 is caused to flow in the oil country tubular goods 101, an internal pressure PI is applied to the oil country tubular goods 101 by the produced fluid 103. By this internal pressure PI, a tensile load FT is applied in the pipe circumferential direction of the oil country tubular goods 101. Further, on account of the tensile load FT in the pipe circumferential direction, a compressive load is applied in the pipe axial direction.

Figure 3:
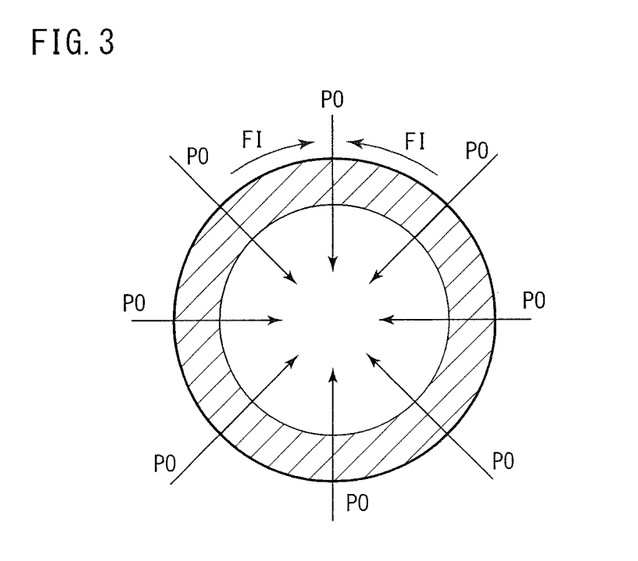
FIG. 3 is another sectional view of the oil country tubular goods shown in FIG. 1, which is different from FIG. 2.

Likewise, referring to FIG. 3, in the case where the oil country tubular goods 101 is a casing, a stratum pressure PO, which is an external pressure, is applied to the outer surface of the oil country tubular goods 101. By this stratum pressure PO, a compressive load FI is applied in the pipe circumferential direction of the oil country tubular goods 101. On account of the compressive load FI, a tensile load is applied in the pipe axial direction.

Such a stress distribution also changes depending on the arrangement place of oil country tubular goods. For example, at the drilling time, a tubing digs and progresses forward in the ground while rotating around the pipe axis. At this time, the most front edge portion of the tubing repeatedly receives a tensile load and compressed load in the pipe axial direction. Also, the oil country tubular goods arranged near the earth's surface is subjected to a tensile load in the pipe axial direction, and also receives a high internal pressure.

Therefore, the austenitic alloy pipe used as an oil country tubular goods is required not only to have balanced yield strengths in the pipe axial direction but also to have internal pressure resistance and external pressure resistance.

In order for the austenitic alloy pipe to achieve these properties, the anisotropy of the tensile yield strength and the compressive yield strength in the pipe axial direction and the pipe circumferential direction of alloy pipe has only to be made low.

To make the anisotropy low, straightening is performed on the cold-worked alloy pipe by using a skew-roll straightening machine, and low-temperature heat treatment is performed at a temperature of 300 to 550° C. By performing straightening and low-temperature heat treatment, the anisotropy of yield strengths of the produced austenitic alloy pipe is made low. Specifically, the tensile yield strength $YS_{LT}$ (MPa) in the pipe axial direction of the alloy pipe, the compressive yield strength $YS_{LC}$ (MPa) in the pipe axial direction thereof, the tensile yield strength $YS_{CT}$ (MPa) in the pipe circumferential direction of the alloy pipe, and the compressive yield strength $YS_{CC}$ (MPa) in the pipe circumferential direction thereof satisfy Formulas (1) to (4).

$$0.90 \leq YS_{LC}/YS_{LT} \leq 1.11 \quad (1)$$

$$0.90 \leq YS_{CC}/YS_{CT} \leq 1.11 \quad (2)$$

$$0.90 \leq YS_{CC}/YS_{LT} \leq 1.11 \quad (3)$$

$$0.90 \leq YS_{CT}/YS_{LT} \leq 1.11 \quad (4)$$

The reason why the anisotropy of yield strengths of the austenitic alloy pipe is made low by performing straightening using the skew-roll straightening machine and low-temperature heat treatment is presumed to be as described below.

Figure 4:
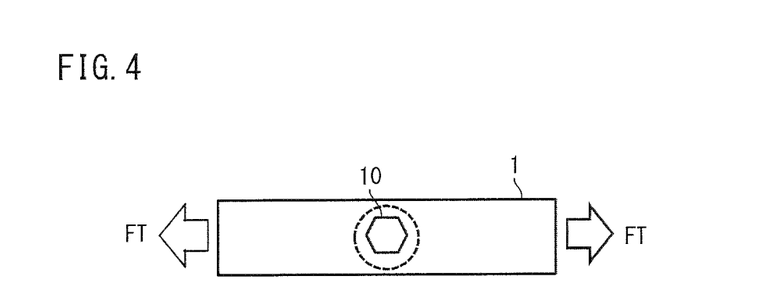
FIG. 4 is a schematic view for explaining the cold working of an alloy pipe.
Figure 5:
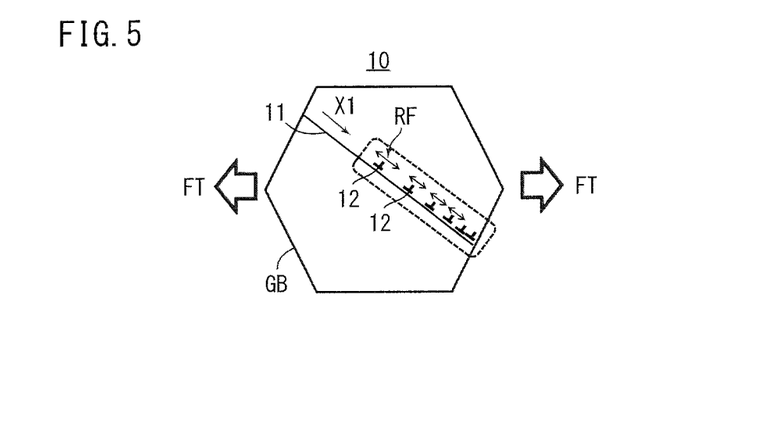
FIG. 5 is a schematic view for explaining the behavior of dislocation within a crystal grain of the alloy pipe shown in FIG. 4.

The cold working elongates the alloy pipe in the axial direction while reducing the diameter thereof. Therefore, the cold working introduces a tensile strain in the axial direction of alloy pipe, and introduces a compressive strain in the circumferential direction. As shown in FIG. 4, attention is paid to any crystal grain 10 in an alloy pipe 1. When cold working is performed, a tensile load FT is applied in the pipe axial direction of the alloy pipe 1. As a result, as shown in FIG. 5, a plurality of dislocations 12 occur in a slip system 11. The dislocations 12 move in the direction X1 shown in FIG. 5 in the slip system 11, and accumulate near a grain boundary GB. Between the accumulated dislocations 12, a repulsive force RF acts.

Figure 6:
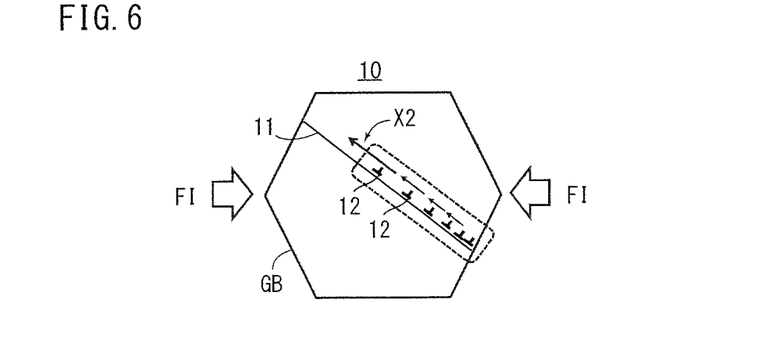
FIG. 6 is a schematic view for explaining the behavior of dislocation within a crystal grain when a compressive load is applied to a cold-worked alloy pipe.

Next, a compressive load FI is applied in the pipe axial direction of the as-cold-worked alloy pipe 1. In this case, as shown in FIG. 6, the dislocations 12 move in the direction X2 opposite to the direction X1 in the slip system 11 due to the use of the repulsive force RF in addition to a load stress $\sigma_{FI}$ based on the compressive load FI. In this case, the true yield stress $\sigma t$ is defined by the following formula.

$$\sigma t = \sigma_{FI} + RF$$

Therefore, due to the repulsive force RF introduced in advance by cold working, the dislocations 12 begin to be active due to the load stress $\sigma_{FI}$ lower than the true yield stress $\sigma t$. In effect, the Baushinger effect is brought about by cold working, and the compressive yield strength $YS_{LC}$ in the pipe axial direction decreases.

The straightening using the skew-roll straightening machine suppresses the Baushinger effect and enhances the compressive yield strength $YS_{LC}$ in the pipe axial direction of the austenitic alloy pipe. The reason for this is not certain, but is presumed to be as described below.

Figure 7:
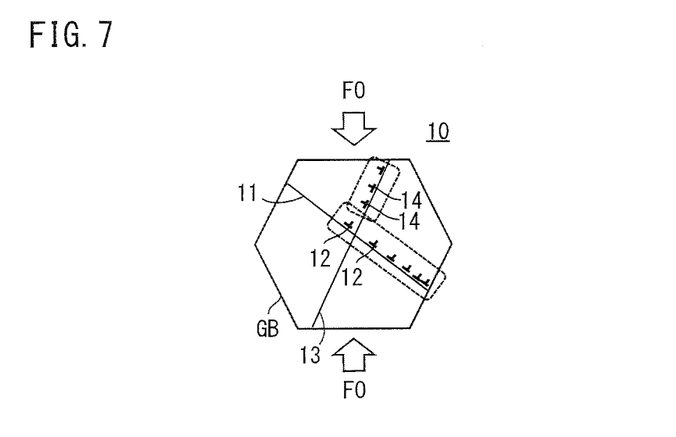
FIG. 7 is a schematic view for explaining the behavior of dislocation within a crystal grain when straightening is performed on a cold-worked alloy pipe.

In the straightening using the skew-roll straightening machine, the alloy pipe 1 is held between skew rolls, and advances while rotating around the pipe axis. At this time, the alloy pipe 1 receives an external force from the direction different from the cold working direction (mainly from the radial direction) on account of the skew rolls. Therefore, in the straightening, as shown in FIG. 7, on account of an external force FO, dislocations 14 occur in a slip system 13 different from the slip system 11 introduced by cold working, and become active.

The dislocations 14 introduced by straightening function as forest dislocations relative to the dislocations 12. Further, the dislocations 12 and 14 intersect with each other, and cut each other. As a result, the dislocations 12 and 14 having a kink portion and a jog portion are formed. The kink portion and jog portion are formed on a slip surface different from other dislocation portions. Therefore, the movements of the dislocations 12 and 14 having the kink portion and the jog portion are restricted. As a result, even if the compressive load FI is applied as shown in FIG. 6, the dislocations 12 are less liable to move, and the decrease in the compressive yield strength $YS_{LC}$ is restrained.

Further, if low-temperature heat treatment at 300 to 550° C. is performed, the anisotropy of yield strengths in the pipe axial direction and the pipe circumferential direction of the cold-worked austenitic alloy pipe becomes low. The reason for this is presumed to be as described below.

The austenitic alloy pipe in accordance with the present invention contains carbon (C) and nitrogen (N). These elements each are smaller in size than elements of Fe, Ni, and the like. Therefore, C and N diffuse in the alloy due to low-temperature heat treatment, and adhere to a portion near the dislocation core. The C and N adhering to the portion near the dislocation core hinder the activity of dislocations due to the Cottrell effect.

Figure 8:
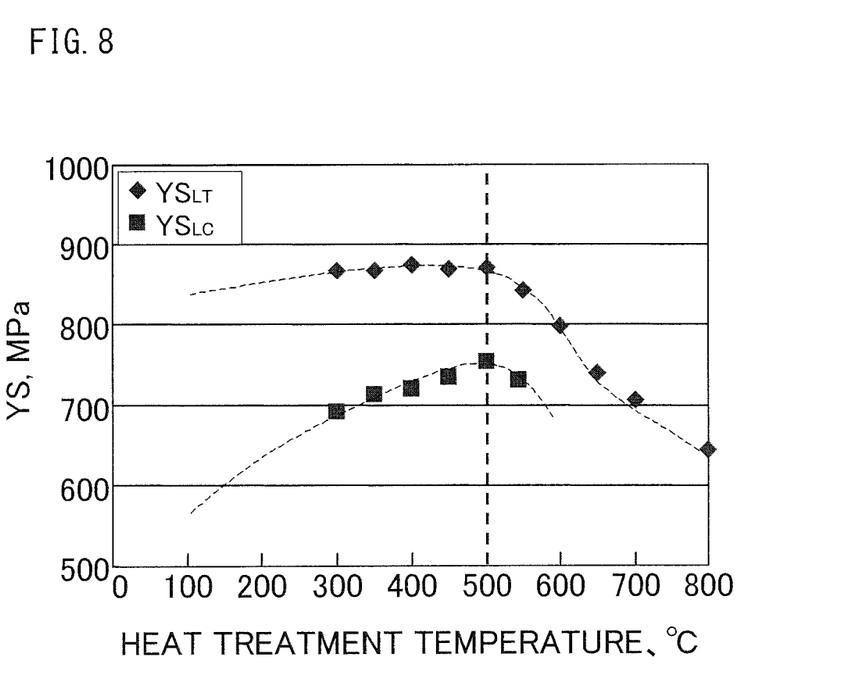
FIG. 8 is a graph showing the relationship between the heat treatment temperature in low-temperature heat treatment and the tensile yield strength and compressive yield strength in the pipe axial direction.

FIG. 8 is a graph showing the relationship between the tensile yield strength $YS_{LT}$ and compressive yield strength $YS_{LC}$ in the pipe axial direction of the austenitic alloy pipe and the heat treatment temperature (° C.). FIG. 8 was obtained by the method described below.

A billet having the chemical composition of alloy A in Table 1, described later, was hot-worked to produce a material pipe. The material pipe was subjected to cold drawing. The reduction of area at this time was 24%. The reduction of area described herein was defined by Formula (I).

Reduction of area=(Cross-sectional area of material pipe before cold working−Cross-sectional area of material pipe after cold working)/Cross-sectional area of material pipe before cold working×100  (I)

The cold-worked alloy pipe was subjected to low-temperature heat treatment at various heat treatment temperatures. The soaking time was 10 minutes. After heat treatment, a tensile test specimen and a compressive test specimen were sampled from the alloy pipe. The size of test specimen was determined in conformity to ASTM-E8 and ASTM-E9. By using the sampled test specimens, a tension test and a compression test were conducted at normal temperature (25° C.) in the atmosphere to determine the tensile yield strength $YS_{LT}$ (MPa) and compressive yield strength $YS_{LC}$ (MPa) in the pipe axial direction, whereby FIG. 8 was obtained.

In FIG. 8, mark "♦" indicates the tensile yield strength $YS_{LT}$ in the pipe axial direction, and mark "■" indicates the compressive yield strength $YS_{LC}$ in the pipe axial direction. Referring to FIG. 8, if low-temperature heat treatment is performed, the compressive yield stress $YS_{LC}$ in the pipe axial direction is increased by the Cottrell effect. On the other hand, the tensile yield strength $YS_{LT}$ in the pipe axial direction is almost constant at a heat treatment temperature of 550° C. or lower.

From the above results, it is presumed that if low-temperature heat treatment is performed in the temperature range of 300 to 550° C., the dislocations introduced by working before heat treatment (in this example, cold working) become less liable to be active due to the Cottrell effect. Therefore, low-temperature heat treatment restrains the decrease in yield strength caused by the Baushinger effect.

As described above, by performing straightening and low-temperature heat treatment, the decrease in yield strength caused by the Baushinger effect, which is brought about at the cold working time, can be restrained. Specifically, as shown in FIG. 7, by straightening, the dislocations 14 are formed in the slip system 13 different from the slip system 11 at the cold working time, whereby the activity of dislocations 12 is hindered. Further, by low-temperature heat treatment, C and N are caused to adhere to a portion near the dislocation core to hinder the activity of dislocations. Based on the above-described findings, the present invention was completed. In the following, the austenitic alloy pipe in accordance with the present invention is described in detail.

The alloy pipe in accordance with this embodiment is an austenitic alloy pipe. In the austenitic alloy, the microstructure thereof substantially consists of austenite. Specifically, the microstructure of austenitic alloy consists of austenite and inclusions and/or precipitates.

Preferably, the austenitic alloy pipe has a chemical composition described below.

[Preferable Chemical Composition of Austenitic Alloy Pipe]

C: at most 0.030

Carbon (C) enhances the strength of alloy. However, if C is contained excessively, Cr carbides are formed at crystal grain boundaries. The Cr carbides increase the crack sensitivity of alloy at the grain boundaries. Therefore, the C content is at most 0.030. The C content is preferably less than 0.030, further preferably at most 0.02%. The lower limit of C content is preferably 0.001%, further preferably 0.003%.

Si: at most 1.0%

Silicon (Si) is a selective element. That is, Si need not necessarily be contained. Silicon deoxidizes an alloy. However, if Si is contained excessively, the hot workability of alloy decreases. Therefore, the Si content is at most 1.0%. The preferable Si content is less than 1.0%. The upper limit of Si content is preferably 0.5%, further preferably 0.4%. The lower limit of Si content is preferably 0.05%, further preferably 0.10%.

Mn: 0.3 to 5.0%

Manganese (Mn) deoxidizes an alloy. Also, Mn is an austenite forming element, and stabilizes an austenite phase. Further, Mn enhances the solubility of N in an alloy. Therefore, particularly when the N content is increased to enhance the alloy strength, Mn restrains pinholes from being formed near the surface. However, if Mn is contained excessively, the hot workability of alloy decreases. Therefore, the Mn content is 0.3 to 5.0%. The preferable Mn content is higher than 0.3% and lower than 5.0%. The upper limit of Mn content is preferably 3.0%, further preferably 1.0%. The lower limit of Mn content is preferably 0.4%.

Ni: 23 to 52%

Nickel (Ni) is an austenite forming element, and stabilizes an austenite phase. Further, Ni forms a Ni sulfide film on the alloy surface, and enhances the sulfide corrosion cracking resistance (SSC resistance) of alloy. However, if Ni is contained excessively, the effects saturate. Therefore, the Ni content is 23 to 52%. The preferable Ni content is higher than 23% and lower than 52%. The upper limit of Ni content is preferably 50%, further preferably 40%. The lower limit of Ni content is preferably 25%, further preferably 29%.

Cr: 20 to 30%

Chromium (Cr) enhances the SSC resistance under coexistence with Ni. Further, Cr enhances the alloy strength due to solid-solution strengthening. On the other hand, if Cr is contained excessively, the effects saturate, and further the hot workability of alloy decreases. Therefore, the Cr content is 20 to 30%. The preferable Cr content is higher than 20% and lower than 30%. The upper limit of Cr content is preferably 27%, further preferably 26%. The lower limit of Cr content is preferably 23%, further preferably 24%.

Mo: at most 9%

Molybdenum (Mo) is a selective element. Therefore, Mo need not necessarily be contained. Mo enhances the SSC resistance of alloy under coexistence with Cr and Ni. Further, Mo enhances the alloy strength due to solid-solution strengthening. However, if Mo is contained excessively, the effects saturate, and further the hot workability of alloy decreases. Therefore, the Mo content is at most 9%. The preferable Mo content is less than 9%. The upper limit of Mo content is preferably 4%. The lower limit of Mo content is preferably 0.01%, further preferably 1.5%.

Cu: at most 3%

Copper (Cu) is a selective element. Therefore, Cu need not necessarily be contained. Cu enhances the SSC resistance of alloy in a hydrogen sulfide environment. However, if Cu is contained excessively, the effect saturates, and further the hot workability decreases. Therefore, the Cu content is at most 3%. The preferable Cu content is less than 3%. The upper limit of Cu content is preferably 2%. The lower limit of Cu content is preferably 0.1%, further preferably 0.5%.

N: 0.005 to 0.50%

Nitrogen (N) enhances the alloy strength due to solid-solution strengthening. For the austenitic alloy pipe in accordance with the present invention, as described above, the C content is suppressed to enhance the corrosion resistance. Therefore, by containing much N in place of C, the alloy strength is enhanced. If N is contained and solid solution heat treatment is performed, an alloy pipe having a high strength can be obtained. If the alloy pipe having a high strength is used, even if cold working at a low working ratio is performed, a desired strength can be given to the cold-worked alloy pipe. However, if N is contained excessively, pinholes are liable to be formed near the surface at the time of the solidification of alloy. Further, N decreases the hot workability of alloy. Therefore, the N content is 0.005 to 0.50%. The preferable N content is higher than 0.005% and lower than 0.50%. The upper limit of N content is preferably 0.30%, further preferably 0.22%. The lower limit of N content is preferably 0.05%, further preferably 0.06%, and still further preferably 0.16%.

The austenitic alloy pipe in accordance with the present invention may further contain, in place of some of Fe, one or more types selected from a group consisting of Ca, Mg, and rare earth metal (REM). All of these elements enhance the hot workability of alloy.

Ca: at most 0.01%

Calcium (Ca) is a selective element. Calcium adheres to S as sulfides, and enhances the hot workability of alloy. However, if Ca is contained excessively, coarse oxides are formed, and the hot workability of alloy decreases. Therefore, the Ca content is at most 0.01%. The preferable Ca content is less than 0.01%. The lower limit of Ca content is preferably 0.0005%.

Mg: at most 0.01%

Magnesium (Mg) is a selective element. Like Ca, Mg adheres to S as sulfides, and enhances the hot workability of alloy. However, if Mg is contained excessively, coarse oxides are formed, and the hot workability of alloy decreases. Therefore, the Mg content is at most 0.01%. The preferable Mg content is less than 0.01%. The lower limit of Mg content is preferably 0.0005%.

Rare earth metal (REM): at most 0.20%

Rare earth metal (REM) is a selective element. Like Ca and Mg, REM adheres to S as sulfides, and enhances the hot workability of alloy. However, if REM is contained excessively, coarse oxides are formed, and the hot workability of alloy decreases. Therefore, the REM content is at most 0.20%.

REM is the general term of 17 elements consisting of 15 elements of lanthanoids, yttrium (Y), and scandium (Sc). The austenitic alloy pipe in accordance with the present invention may contain one or more types of these 17 elements as REMs. The REM content means the total content of one or more types of these 17 elements. As the adding method, one or more types of REMs may be added, or on an industrial basis, they may be added as a mischmetal.

The preferable REM content is less than 0.20%. The lower limit of REM content is preferably 0.001%.

The balance of the chemical composition of the austenitic alloy pipe in accordance with the present invention consists of Fe and impurities. The "impurities" described herein mean elements that mixedly enter from ore or scrap used as a raw material of alloy, the environment of production process, or the like. Preferably, of the impurities, P, S, and O are restricted in content as described below.

P: at most 0.03%

Phosphorus (P) is an impurity. P enhances the stress corrosion cracking susceptibility of alloy in a hydrogen sulfide environment. Therefore, the P content is preferably as low as possible. The P content is preferably at most 0.03%, further preferably less than 0.03%, and still further preferably at most 0.025%.

S: at most 0.03%

Sulfur (S) is an impurity. S decreases the hot workability of alloy. Therefore, the S content is preferably as low as possible. The S content is preferably at most 0.03%, further preferably less than 0.03%, and still further preferably at most 0.005%.

O: at most 0.010%

Oxygen (O) is an impurity. O decreases the hot workability of alloy. Therefore, the O content is preferably as low as possible. The O content is preferably at most 0.010%, further preferably less than 0.010%.

[Production Method]

One example of the method for producing the austenitic alloy pipe in accordance with the present invention is explained.

First, an austenitic alloy is melted to produce molten alloy. To melt the alloy, an electric furnace, an Ar—$O_2$ mixed gas bottom blowing decarburization furnace (AOD furnace), a vacuum decarburization furnace (VOD furnace), or the like furnace can be used.

A cast material is produced by using the molten alloy. The cast material is, for example, an ingot, a slab, or a bloom. Specifically, an ingot is produced by the ingot-making process. Alternatively, a slab or a bloom is produced by the continuous casting process.

The cast material is subjected to hot working to produce a round billet. The hot working is, for example, hot rolling or hot forging. The produced round billet is hot-worked to produce a material pipe. Specifically, the material pipe is produced from the round billet by the extrusion pipe production method represented by the Ugine-Sejournet process. Alternatively, the material pipe is produced from the round billet by the Mannesmann pipe making process.

The produced material pipe is subjected to cold working. The reason for this is that the strength of austenitic alloy pipe is enhanced, and the tensile yield strength $YS_{LT}$ in the pipe axial direction is increased to 689.1 MPa or higher.

The cold working includes cold drawing and cold rolling represented by Pilger rolling. In the present invention, either of the cold drawing and the cold rolling may be adopted. The cold drawing gives the alloy pipe a high tensile strain in the pipe axial direction as compared with the cold rolling. The cold rolling gives the alloy pipe a high tensile strain not only in the pipe axial direction but also in the pipe circumferential direction of material pipe. Therefore, the cold rolling gives the alloy pipe a high compressive strain in the pipe circumferential direction of material pipe as compared with the cold drawing.

The preferable reduction of area at the time of cold working is 15.0% or more. The reduction of area is defined by Formula (I). If cold working is performed at the above-described reduction of area, the tensile yield strength $YS_{LT}$ can be increased to 689.1 MPa or higher. The preferable lower limit of the reduction of area is 20.0%. If the reduction of area is too high, the roundness of alloy pipe decreases. Therefore, the preferable upper limit of reduction of area in cold drawing is 50.0%, and the preferable upper limit of reduction of area in cold rolling is 80.0%.

Between the hot working and the cold working, any other treatment may be performed. For example, the hot-worked material pipe is subjected to solid solution heat treatment. The material pipe subjected to solid solution heat treatment is descaled to remove scale. The descaled material pipe is subjected to cold working.

Further, the cold working may be performed a plurality of times. In the case where the cold working is performed a plurality of times, between the cold working and the next cold working, solid solution heat treatment may be performed as softening heat treatment. In the case where the cold working is performed a plurality of times, after the final cold working, the material pipe is subjected to treatments described below.

The cold-rolled material pipe is subjected to straightening using a skew-roll straightening machine and low-temperature heat treatment. Either of the straightening and the low-temperature heat treatment may be performed first. That is, the straightening is performed after cold working, and thereafter the low-temperature heat treatment may be performed. Alternatively, the low-temperature heat treatment is performed after cold working, and thereafter the straightening may be performed. Also, the straightening may be performed a plurality of times, or the low-temperature heat treatment may be performed a plurality of times. For example, the cold working, the first straightening, the low-temperature heat treatment, and the second straightening may be performed in that order, or the cold working, the first low-temperature heat treatment, the straightening, and the second low-temperature heat treatment may be performed in that order. In the following, the details of straightening and low-temperature heat treatment are explained.

[Straightening]

Figure 9:
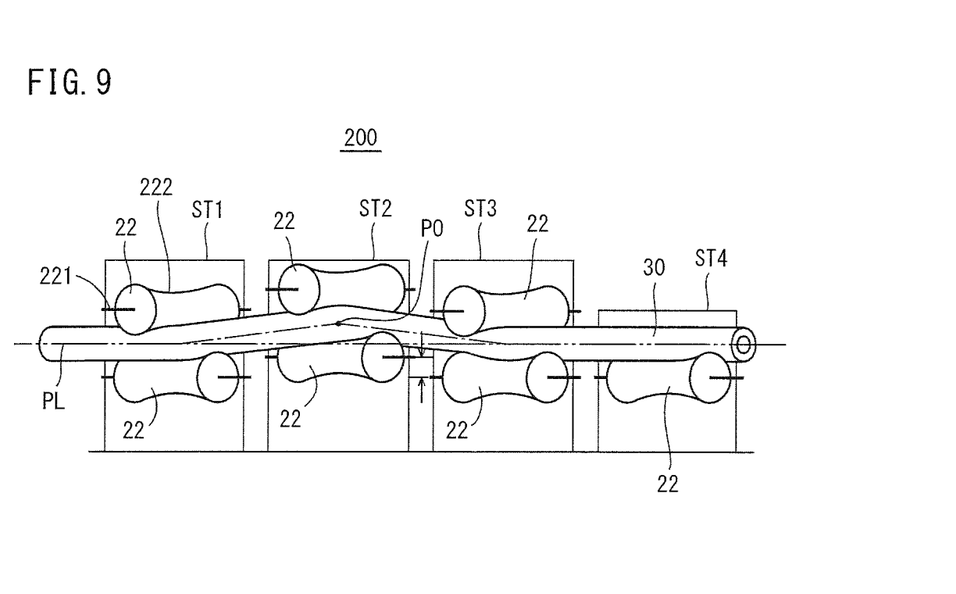
FIG. 9 is a schematic view of a straightening machine.

FIG. 9 is a schematic view of a straightening machine 200. Referring to FIG. 9, the straightening machine 200 used in this example is of a skew roll type. The straightening machine 200 shown in FIG. 9 has a plurality of stands ST1 to ST4. The plurality of stands ST1 to ST4 are arranged in a row.

Each of the stands ST1 to ST4 is provided with a pair of or one skew roll 22. Specifically, the rearmost stand ST4 is provided with one skew roll 22, and the other stands ST1 to ST3 each are provided with a pair of skew rolls that are arranged on the upside and downside.

Each of the skew roll 22 includes a roll shaft 221 and a roll surface 222. The roll shaft 221 tilts slantwise with respect to a pass line PL. The roll shafts 221 of the paired skew rolls 22 at each of the stands ST1 to ST3 intersect with each other. Since the roll shafts 221 of the skew rolls 22 arranged on the upside and downside tilt slantwise with respect to the pass line PL and intersect with each other, the skew rolls 22 can give a material pipe 30 rotations in the pipe circumferential direction. The roll surface 222 has a concave shape.

The center PO of a gap between the skew rolls 22 at the stand ST2 is arranged so as to be offset from the pass line PL. Therefore, the stands ST1 and ST2 bend the material pipe 30, and the stands ST2 and ST3 bend back the material pipe 30. Thereby, the straightening machine 200 straightens the bend of the material pipe 30.

The straightening machine 200 further presses down the material pipe 30 in the radial direction by using the paired skew rolls 22 of each stand STi (i=1 to 3). Thereby, the roundness of the material pipe 30 is increased and the anisotropy of yield strengths of the material pipe 30 is decreased by the straightening machine 200.

Figure 10:
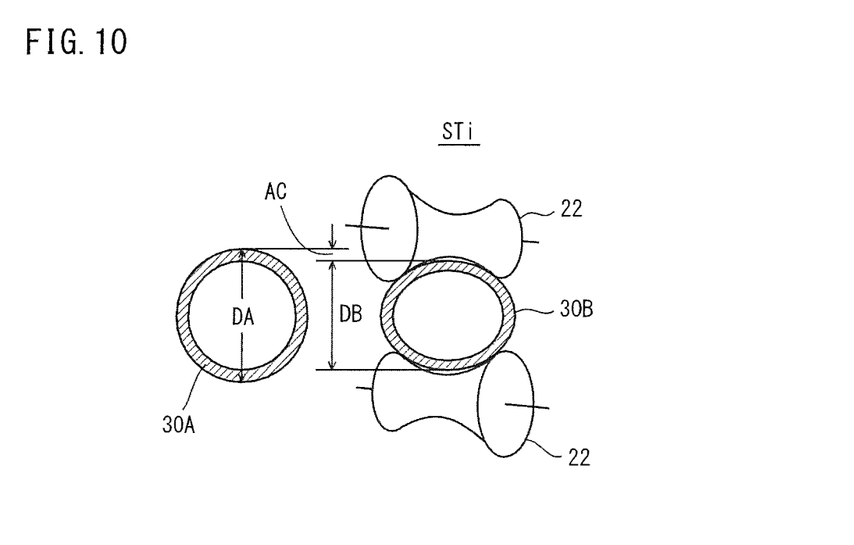
FIG. 10 is a front view of a stand of the straightening machine shown in FIG. 9.

FIG. 10 is a front view of the skew rolls 22 and the material pipe 30 at the stand STi having the paired skew rolls 22. By the paired skew rolls 22, the material pipe 30 is pressed down (rolled). When the outside diameter of a material pipe 30A before rolling at the stand STi is taken as DA, and the outside diameter of a material pipe 30B after rolling at the stand STi is taken as DB, a crush amount AC (mm) is defined by Formula (II).

$$AC = DA - DB \quad (II)$$

Further, the crush ratio RC (%) is defined by Formula (III).

$$RC = (DA - DB)/DA \times 100 \quad (III)$$

Each stand STi rolls the material pipe 30, which rotates in the circumferential direction, in the crush amount AC set for each stand, gives the material pipe 30 a strain. The dislocations occurring in the material pipe 30 due to rolling are active in a slip system different from that of dislocations occurring at the time of cold working as shown in FIG. 7. Therefore, the dislocations occurring at the time of straightening and the dislocations occurring at the time of cold working collide with and cut each other, and resultantly, the dislocations become less liable to move. Therefore, the straightening restrains the compressive stress strength $YS_{LC}$ in the pipe axial direction from being decreased by the Baushinger effect.

As described above, in order to decrease the anisotropy of yield strengths, especially, the anisotropy of yield strengths in the pipe axial direction, the rolling using the skew rolls 22 are effective. As the crush ratio RC is higher, strain can be given to the radial direction of the material pipe 30. The maximum of the crush ratios RC of the stands STi is defined as the maximum crush ratio. The rolling at the maximum crush ratio can give the material pipe 30 the highest strain. Therefore, it is presumed that the maximum crush ratio is effective in decreasing the anisotropy of yield strengths in the pipe axial direction. The maximum crush ratio is preferably 2.0 to 15.0%. The lower limit of the maximum crush ratio is further preferably 5.0%, and the upper limit of the maximum crush ratio is further preferably 12.0%.

In FIG. 9, the straightening machine 200 is provided with seven skew rolls 22 and four stands ST1 to ST4. However, the number of skew rolls 22 is not limited to seven, and the number of stands is not limited to four. The number of skew rolls 22 may be ten or any other plural number. In the case where the number of skew rolls is an odd number, the rearmost stand is provided with one skew roll, and the other stands each are provided with a pair of skew rolls. In the case where the number of skew rolls is an even number, all of the stands each are provided with a pair of skew rolls.

[Low-Temperature Heat Treatment]

In the low-temperature heat treatment, the material pipe is charged into a heat treatment furnace. In the furnace, the material pipe is soaked at a temperature of 300 to 550° C. By the soaking in the above-described temperature range, C and N in the material pipe are diffused, and are caused to be liable to adhere to a portion near the dislocation core. As a result, the dislocations become less liable to move, and decrease the anisotropy of yield strengths in the pipe axial direction and pipe circumferential direction.

If the heat treatment temperature exceeds 550° C., the yield strength decreases. The reason for this is presumed to be that the temperature is high, and therefore the dislocations incorporate with each other and disappear.

The preferable heat treatment temperature is 400 to 500° C. In the case of this temperature range, the compressive yield strength especially in the pipe axial direction increases. Therefore, the anisotropy of yield strengths in the pipe axial direction decreases. The preferable soaking time is five minutes or longer. In the case of this soaking time, C and N in the alloy diffuse sufficiently. The preferable upper limit of soaking time is 60 minutes. Since the heat treatment temperature in the low-temperature heat treatment is low, the bend of the heat-treated material pipe is less liable to occur.

By the above-described processes, the austenitic alloy pipe satisfying Formulas (1) to (4) is produced.

As described above, the order of straightening and low-temperature heat treatment is not subject to any special restriction. Preferably, however, straightening is performed after cold working, and low-temperature heat treatment is performed after straightening. In this case, C and N adhere to not only the dislocations occurring due to cold working but also the dislocations occurring due to straightening, and the Cottrell effect is achieved. Therefore, the anisotropy of yield strengths in the pipe axial direction and the pipe circumferential direction is further liable to decrease.

EXAMPLES

A plurality of austenitic alloy pipes were produced under different production conditions. The anisotropies of yield strengths of the produced alloy pipes were examined.

Alloys A to D each having the chemical composition given in Table 1 were melted to produce ingots.

TABLE 1

| Alloy | Chemical composition (unit: mass %, balance being Fe and impurities) | | | | | | | | |
|---|---|---|---|---|---|---|---|---|---|
| | C | Si | Mn | Ni | Cr | N | Mo | Cu | Nd |
| A | 0.018 | 0.26 | 0.63 | 30.3 | 24.7 | 0.08 | 2.85 | 0.75 | — |
| B | 0.017 | 0.24 | 0.70 | 31.2 | 25.4 | 0.08 | 3.02 | 0.79 | — |
| C | 0.020 | 0.25 | 0.62 | 32.3 | 26.7 | 0.08 | 3.30 | 0.81 | — |
| D | 0.014 | 0.29 | 0.56 | 32.5 | 24.8 | 0.2 | 3.11 | 0.74 | 0.03 |

The chemical compositions of all of alloys A to D were within the preferable range of the present invention. In alloys A to D, the P content was at most 0.03%, the S content was at most 0.03%, the O content was at most 0.010%.

The produced ingots were hot-extruded to produce a plurality of material pipes for cold working. The material pipes for cold working underwent the production processes given in Table 2 to produce austenitic alloy pipes of mark 1 to mark 21.

TABLE 2

| Mark | Alloy | Outside diameter (mm) | Production process | Heat treatment temperature (° C.) | Number of rdls | Max. crush ratio (%) |
|---|---|---|---|---|---|---|
| 1 | A | 89.3 | AsP/D | — | — | — |
| 2 | B | 60.0 | CR | — | — | — |
| 3 | B | 60.0 | CR | — | — | — |
| 4 | C | 89.0 | CR→STR | — | 10 | 4.0 |
| 5 | C | 89.0 | CR→STR | — | 10 | 4.0 |
| 6 | A | 89.3 | P/D→Heat treatment | 350 | — | — |
| 7 | A | 89.3 | P/D→Heat treatment | 400 | — | — |
| 8 | A | 89.3 | P/D→Heat treatment | 450 | — | — |
| 9 | A | 89.3 | P/D→Heat treatment | 500 | — | — |
| 10 | A | 89.3 | P/D→Heat treatment→STR | 350 | 10 | 2.2 |
| 11 | A | 89.3 | P/D→Heat treatment→STR | 350 | 10 | 4.0 |
| 12 | A | 89.3 | P/D→Heat treatment→STR | 350 | 10 | 4.0 |
| 13 | A | 89.3 | P/D→STR→Heat treatment | 500 | 10 | 4.0 |
| 14 | A | 89.3 | P/D→STR→Heat treatment | 500 | 10 | 4.0 |
| 15 | A | 89.3 | P/D→Heat treatment→STR | 350 | 7 | 6.7 |
| 16 | A | 89.3 | P/D→Heat treatment→STR | 350 | 7 | 11.2 |
| 17 | A | 89.3 | P/D→Heat treatment→STR | 350 | 7 | 11.2 |
| 18 | A | 89.3 | P/D→1st STR→Heat treatment→2nd STR | 500 | 7 | 1st STR: 6.7 2nd STR: 11.2 |
| 19 | B | 60.0 | CR→STR→Heat treatment | 500 | 7 | 10 |
| 20 | B | 60.0 | CR→STR→Heat treatment | 500 | 7 | 10 |
| 21 | D | 89.3 | CR→STR→Heat treatment | 500 | 7 | 10 |

| Mark | $YS_{LT}$ (MPa) | $YS_{CT}$ (MPa) | $YS_{LC}$ (MPa) | $YS_{CC}$ (MPa) | F1 ($YS_{LC}/YS_{LT}$) | F2 ($YS_{CC}/YS_{CT}$) | F3 ($YS_{CC}/YS_{LT}$) | F4 ($YS_{CT}/YS_{LT}$) |
|---|---|---|---|---|---|---|---|---|
| 1 | 823 | 784 | 595 | 847 | 0.72 | 1.08 | 1.03 | 0.95 |
| 2 | 773 | 661 | 677 | 783 | 0.88 | 1.18 | 1.01 | 0.86 |
| 3 | 784 | 668 | 690 | 787 | 0.88 | 1.18 | 1.00 | 0.85 |
| 4 | 779 | 640 | 719 | 756 | 0.92 | 1.18 | 0.97 | 0.82 |
| 5 | 768 | 654 | 727 | 776 | 0.95 | 1.19 | 1.01 | 0.85 |
| 6 | 876 | 823 | 713 | 846 | 0.81 | 1.03 | 0.97 | 0.94 |
| 7 | 879 | 818 | 720 | 838 | 0.82 | 1.02 | 0.95 | 0.93 |
| 8 | 877 | 825 | 734 | 853 | 0.84 | 1.03 | 0.97 | 0.94 |
| 9 | 880 | 817 | 754 | 840 | 0.86 | 1.03 | 0.95 | 0.93 |
| 10 | 833 | 851 | 758 | 876 | 0.91 | 1.03 | 1.05 | 1.02 |
| 11 | 823 | 835 | 762 | 872 | 0.93 | 1.04 | 1.06 | 1.01 |
| 12 | 802 | 837 | 758 | 874 | 0.95 | 1.04 | 1.09 | 1.04 |
| 13 | 823 | 817 | 833 | 851 | 1.01 | 1.04 | 1.03 | 0.99 |
| 14 | 831 | 817 | 837 | 855 | 1.01 | 1.05 | 1.03 | 0.98 |
| 15 | 827 | 802 | 741 | 868 | 0.90 | 1.08 | 1.05 | 0.97 |
| 16 | 845 | 825 | 778 | 872 | 0.92 | 1.06 | 1.03 | 0.98 |
| 17 | 813 | 796 | 780 | 886 | 0.96 | 1.11 | 1.09 | 0.98 |
| 18 | 835 | 815 | 825 | 853 | 0.99 | 1.05 | 1.02 | 0.98 |
| 19 | 755 | 702 | 749 | 777 | 0.99 | 1.11 | 1.03 | 0.93 |
| 20 | 764 | 708 | 756 | 783 | 0.99 | 1.11 | 1.02 | 0.93 |
| 21 | 854 | 826 | 864 | 833 | 1.01 | 1.01 | 0.98 | 0.97 |

Referring to Table 2, in the "Alloy" column, the kind (alloys A to D) of the billet used is described. In the "Outside diameter" column, the outside diameter of the produced austenitic alloy pipe is described.

In the "Production process" column, the production process performed on the material pipe for cold working is described. Referring to the production process column, symbol "P/D" means cold drawing. Symbol "CR" means cold rolling. Symbol "STR" means straightening. "Heat treatment" means low-temperature heat treatment.

In Examples, the reduction of area in cold drawing was 24%, and the reduction of area in cold rolling was 34%. The reduction of area (%) was determined by the aforementioned Formula (I).

In the "Heat treatment temperature" column, the heat treatment temperature of low-temperature heat treatment performed during the production process is described. In the "Number of rolls" column, the number of skew rolls of the straightening machine used for straightening is described. In the "Max. crush ratio" column, the maximum crush ratio at the straightening time is described.

Specifically, the material pipes for cold working (hereinafter, referred simply to as material pipes) underwent the production processes described below. The material pipe of mark 1 was subjected to cold drawing only to produce an austenitic alloy pipe. That is, the austenitic alloy pipe of mark 1 was an as-cold-drawn material. The material pipes of marks 2 and 3 were subjected to cold rolling only to produce austenitic alloy pipes.

The material pipes of marks 4 and 5 were subjected to cold rolling, and thereafter were subjected to straightening at the maximum crush ratio given in Table 2. The material pipes of marks 6 to 9 were subjected to cold drawing, and thereafter were subjected to low-temperature heat treatment at the heat treatment temperatures described in Table 2.

The material pipes of marks 10 to 12 and 15 to 17 were subjected to cold drawing. The cold-drawn material pipes were subjected to low-temperature heat treatment. The heat-treated material pipes were subjected to straightening. The material pipes of marks 13 and 14 were subjected to cold drawing, and thereafter were subjected to straightening. After being straightened, the material pipes were subjected to low-temperature heat treatment.

The material pipe of mark 18 was subjected to straightening two times. Specifically, after being subjected to cold drawing, the material pipe was subjected to first straightening. The maximum crush ratio at the first straightening time was 6.70%. After being subjected to first straightening, the material pipe was subjected to low-temperature heat treatment. The heat-treated material pipe was subjected to second straightening. The maximum crush ratio at the second straightening time was 11.20%.

The material pipes of marks 19 to 21 were subjected to cold rolling, and thereafter were subjected to straightening. After being straightened, the material pipes were subjected to low-temperature heat treatment.

From the produced austenitic alloy pipe of each mark, compressive test specimens and tensile test specimens were sampled. Specifically, a tensile test specimen and compressive test specimen extending in the pipe axial direction of each mark were sampled, and a tensile test specimen and compressive test specimen extending in the pipe circumferential direction of each mark were sampled.

The dimensions of each test specimen was in conformity to ASTM-E8 and ASTM-E9. The outside diameters of the compressive test specimens and the standard test specimens of the compressive test specimens each were 6.35 mm, and the gage lengths thereof each were 12.7 mm. In each mark, when the standard test specimen could not be sampled, a proportional test specimen was sampled.

By using the sampled compressive test specimens and tensile test specimens, a compressive test and tensile test were conducted at normal temperature (25° C.) in the atmosphere to determine the compressive yield strengths and tensile yield strengths. Specifically, by using the tensile test specimen extending in the pipe axial direction, the tensile yield strength $YS_{LT}$ (MPa) in the pipe axial direction was obtained. By using the tensile test specimen extending in the pipe circumferential direction, the tensile yield strength $YS_{CT}$ (MPa) in the pipe circumferential direction was obtained. By using the compressive test specimen extending in the pipe axial direction, the compressive yield strength $YS_{LC}$ (MPa) in the pipe axial direction was obtained. By using the compressive test specimen extending in the pipe circumferential direction, the compressive yield strength $YS_{CC}$ (MPa) in the pipe circumferential direction was obtained. Each yield strength was defined in terms of the 0.2% yield stress in the tensile test and compressive test. The obtained yield strengths ($YS_{LT}$, $YS_{CT}$, $YS_{LC}$ and $YS_{CC}$) are given in Table 2.

By using the obtained yield strengths, F1 to F4 described below were determined for each mark.

$$F1 = YS_{LC}/YS_{LT}$$

$$F2 = YS_{CC}/YS_{CT}$$

$$F3 = YS_{CC}/YS_{LT}$$

$$F4 = YS_{CT}/YS_{LT}$$

The obtained F1 to F4 are given in Table 2.

[Examination Results]

Referring to Table 2, for the austenitic alloy pipes of marks 10 to 21, the values of F1 to F4 satisfied Formulas (1) to (4). In particular, in marks 13, 14, 19, and 21, since low-temperature heat treatment was performed after straightening, the anisotropy of yield strengths in the pipe axial direction was extremely low.

On the other hand, for the austenitic alloy pipes of marks 1 to 9, one or more of F1 to F4 did not satisfy Formulas (1) to (4). Specifically, the F1 value of mark 1 was less than 0.90. The reason for this is presumed to be as described below. The material pipe of mark 1 was elongated in the axial direction by cold drawing; therefore, due to the Baushinger effect, the compressive yield strength $YS_{LC}$ in the pipe axial direction became excessively lower than the tensile yield strength $YS_{LT}$ in the pipe axial direction.

The F1 value and F4 value of marks 2 and 3 were less than 0.90, and the F2 value thereof exceeded 1.11. The material pipes of marks 2 and 3 was subjected to cold rolling only. The material pipe during cold rolling is tensionedly deformed in the axial direction and is compressedly deformed in the circumferential direction. In particular, the compressive deformation in the circumferential direction of material pipe in the cold rolling is larger than that in the cold drawing. In marks 2 and 3, due to the Baushinger effect, the compressive yield strength $YS_{LC}$ in the pipe axial direction became excessively lower than the tensile yield strength $YS_{LT}$ in the pipe axial direction, and the tensile yield strength $YS_{CT}$ in the pipe circumferential direction became excessively lower than the compressive yield strength $YS_{CC}$ in the pipe circumferential direction. Therefore, it is presumed that Formulas (1), (2) and (4) were not satisfied.

In marks 4 and 5, the F2 value and F4 value did not satisfy Formulas (2) and (4), respectively. It is presumed that by performing the straightening, the compressive yield strength $YS_{LC}$ in the pipe axial direction was improved; however, the anisotropy of yield strengths in the pipe circumferential direction was not improved, so that Formulas (2) and (4) were not satisfied.

In marks 6 to 9, the F1 value did not satisfy Formula (I). It is presumed that although the compressive yield strength in the pipe axial direction was improved by the low-temperature heat treatment, the F1 value did not result satisfying Formula (I).

The above is the explanation of an embodiment of the present invention. The embodiment is merely an illustration for carrying out the present invention. Therefore, the present invention is not limited to the embodiment, and the embodiment can be carried out by being changed as appropriate without departing from the spirit and scope of the present invention.

INDUSTRIAL APPLICABILITY

The austenitic alloy pipe in accordance with the present invention can be used widely as an oil country tubular goods. Especially, it can be used as a tubing and a casing.

The invention claimed is:

1. An austenitic alloy pipe, wherein
a tensile yield strength $YS_{LT}$ in a pipe axial direction of the alloy pipe is at least 689.1 MPa; and
the tensile yield strength $YS_{LT}$, a compressive yield strength $YS_{LC}$ in the pipe axial direction, a tensile yield strength $YS_{CT}$ in a pipe circumferential direction of the alloy pipe, and a compressive yield strength $YS_{CC}$ in the pipe circumferential direction satisfy Formulas (1) to (4).

$$0.90 \leq YS_{LC}/YS_{LT} \leq 1.11 \quad (1)$$

$$0.90 \leq YS_{CC}/YS_{CT} \leq 1.11 \quad (2)$$

$$0.90 \leq YS_{CC}/YS_{LT} \leq 1.11 \quad (3)$$

$$0.90 \leq YS_{CT}/YS_{LT} \leq 1.11 \quad (4)$$

2. The austenitic alloy pipe according to claim 1, comprising, by mass percent, of C: at most 0.03%, Si: at most 1.0%, Mn: 0.3 to 5.0%, Ni: 23 to 52%, Cr: 20 to 30%, N: 0.005 to 0.50%, Mo: at most 9%, and Cu: at most 3%, the balance being Fe and impurities.

3. The austenitic alloy pipe according to claim 2, comprising, in place of some of the Fe, at least one type selected from a group consisting, by mass percent, of Ca: at most 0.01%, Mg: at most 0.01%, and REM (rare earth metal): at most 0.20%.

4. The austenitic alloy pipe according to claim 1, which is produced by being subjected to straightening and low-temperature heat treatment at 300 to 550° C. after being cold-worked.

5. The austenitic alloy pipe according to claim 4, which is produced by being subjected to the low-temperature heat treatment after being straightened.

6. A method for producing an austenitic alloy pipe, comprising:
a process for producing an austenitic alloy material pipe;
a process for cold-working the material pipe; and
a process for producing an austenitic alloy pipe, wherein by subjecting the cold-worked material pipe to straightening and low-temperature heat treatment at 300 to 550° C., the alloy pipe is provided with a tensile yield strength $YS_{LT}$ of at least 689.1 MPa in a pipe axial direction of the alloy pipe, and wherein for the alloy pipe, the tensile yield strength $YS_{LT}$, a compressive yield strength $YS_{LC}$ (MPa) in the pipe axial direction, a tensile yield strength $YS_{CT}$ (MPa) in a pipe circumferential direction, and a compressive yield strength $YS_{CC}$ (MPa) in the pipe circumferential direction satisfy Formulas (1) to (4).

$$0.90 \leq YS_{LC}/YS_{LT} \leq 1.11 \quad (1)$$

$$0.90 \leq YS_{CC}/YS_{CT} \leq 1.11 \quad (2)$$

$$0.90 \leq YS_{CC}/YS_{LT} \leq 1.11 \quad (3)$$

$$0.90 \leq YS_{CT}/YS_{LT} \leq 1.11 \quad (4)$$

7. The method for producing an austenitic alloy pipe according to claim 6, wherein the material pipe is subjected to the low-temperature heat treatment after being straightened.

8. The method for producing an austenitic alloy pipe according to claims 6, wherein the material pipe comprises, by mass percent, of C: at most 0.03%, Si: at most 1.0%, Mn: 0.3 to 5.0%, Ni: 23 to 52%, Cr: 20 to 30%, N: 0.005 to 0.50%, Mo: at most 9%, and Cu: at most 3%, the balance being Fe and impurities.

9. The method for producing an austenitic alloy pipe according to claim 8, wherein the material pipe comprises, in place of some of the Fe, at least one type selected from a group consisting, by mass percent, of Ca: at most 0.01%, Mg: at most 0.01%, and REM (rare earth metal): at most 0.20%.

10. The austenitic alloy pipe according to claim 2, which is produced by being subjected to straightening and low-temperature heat treatment at 300 to 550° C. after being cold-worked.

11. The austenitic alloy pipe according to claim 3, which is produced by being subjected to straightening and low-temperature heat treatment at 300 to 550° C. after being cold-worked.

12. The austenitic alloy pipe according to claim 10, which is produced by being subjected to the low-temperature heat treatment after being straightened.

13. The austenitic alloy pipe according to claim 11, which is produced by being subjected to the low-temperature heat treatment after being straightened.

14. The method for producing an austenitic alloy pipe according to claims 7, wherein the material pipe comprises, by mass percent, of C: at most 0.03%, Si: at most 1.0%, Mn: 0.3 to 5.0%, Ni: 23 to 52%, Cr: 20 to 30%, N: 0.005 to 0.50% Mo: at most 9%, and Cu: at most 3%, the balance being Fe and impurities.

15. The method for producing an austenitic alloy pipe according to claim 14, wherein the material pipe comprises, in place of some of the Fe, at least one type selected from a group consisting, by mass percent, of Ca: at most 0.01%, Mg: at most 0.01%, and REM (rare earth metal): at most 0.20%.

16. The austenitic alloy pipe according to claim 1, wherein a microstructure of the austenitic alloy pipe substantially consists of austenite.

17. The method for producing an austenitic alloy pipe according to claim 6, wherein a microstructure of the austenitic alloy pipe substantially consists of austenite.

18. The method for producing an austenitic alloy pipe according to claim 6, wherein the process for producing the austenitic alloy material pipe is hot-working.

19. The method for producing an austenitic alloy pipe according to claim 6, wherein the process for cold-working the material pipe is either cold drawing or cold rolling.

* * * * *